United States Patent
Kedia et al.

(10) Patent No.: US 11,809,476 B1
(45) Date of Patent: Nov. 7, 2023

(54) MODULAR DATABASE RECRAWL SYSTEM

(71) Applicant: Microsoft Technology Licensing, LLC, Redmond, WA (US)

(72) Inventors: Yash Rajkumar Kedia, Redmond, WA (US); Kristofer D. Hoffman, Sammamish, WA (US); Ana Monica Irimia, Adliswil (CH); John Berkeley, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/837,446

(22) Filed: Jun. 10, 2022

(51) Int. Cl.
*G06F 16/24* (2019.01)
*G06F 16/35* (2019.01)
*G06F 16/335* (2019.01)
*G06F 16/2455* (2019.01)

(52) U.S. Cl.
CPC ........ *G06F 16/353* (2019.01); *G06F 16/2455* (2019.01); *G06F 16/335* (2019.01)

(58) Field of Classification Search
CPC ... G06F 16/353; G06F 16/2455; G06F 16/335
USPC ........................................................ 707/737
See application file for complete search history.

(56) References Cited

U.S. PATENT DOCUMENTS

| | | | | |
|---|---|---|---|---|
| 7,379,932 B2 * | 5/2008 | Agrawal | ............... | G06F 16/951 707/999.001 |
| 11,216,513 B1 * | 1/2022 | Zhang | ................... | G06F 16/285 |
| 11,468,385 B2 * | 10/2022 | Bennett | ................. | G06F 21/577 |
| 2002/0087587 A1 | 7/2002 | Vos et al. | | |
| 2007/0143263 A1 * | 6/2007 | Agrawal | ............... | G06F 16/951 |
| 2008/0168041 A1 * | 7/2008 | Joshi | ..................... | G06F 16/951 |
| 2009/0106327 A1 | 4/2009 | Dilman et al. | | |
| 2013/0179424 A1 * | 7/2013 | Xu | ........................ | G06F 16/951 707/E17.108 |
| 2013/0198221 A1 * | 8/2013 | Roark | .................... | G06F 16/93 707/769 |

(Continued)

OTHER PUBLICATIONS

Singh, Jasminder, "Inheritance vs Containment", Retrieved from: https://web.archive.org/web/20210513224238/https://www.c-sharpcorner.com/UploadFile/b1df45/inheritance-vs-containment/, May 13, 2021, 09 Pages.

(Continued)

*Primary Examiner* — Hanh B Thai
(74) *Attorney, Agent, or Firm* — Novo TechIP International PLLC

(57) ABSTRACT

Systems and methods for reprocessing documents in a database system include receiving job definitions performing reprocessing operations on documents in the database system, and generating recrawl jobs based on the job definitions. The recrawl jobs are flighted to the database system. Iterations of recrawl timer jobs are generated for each of the databases based on a predefined recrawl timer job base class. Each of the recrawl timer job iterations being configured to access a recrawl job list for the one of the databases and access a property list for the databases to identify recrawl job information stored in the property list. Based on the recrawl job information, a respective batch of documents to be reprocessed in association with each of the recrawl jobs on the recrawl job list is selected. The batches of documents are then reprocessed in accordance with the recrawl jobs. The recrawl job information is then updated based on the completion of the batches.

20 Claims, 7 Drawing Sheets

(56) References Cited

U.S. PATENT DOCUMENTS

| | | | | |
|---|---|---|---|---|
| 2021/0120034 A1* | 4/2021 | Starov | .................. | G06F 21/563 |
| 2021/0133648 A1* | 5/2021 | Bennett | ............... | G06F 21/6245 |
| 2021/0365503 A1* | 11/2021 | Zhang | .................. | G06F 16/353 |
| 2022/0345487 A1* | 10/2022 | Starov | .................. | G06F 21/563 |

OTHER PUBLICATIONS

"International Search Report and Written Opinion issued in PCT Application No. PCT/US23/019717", dated Aug. 4, 2023, 16 Pages.

* cited by examiner

MODULAR DATABASE RECRAWL SYSTEM

BACKGROUND

Cloud-based services provide computing services over the Internet or a dedicated network. The cloud-based services may provide computing resources, analytics, storage, and network resources to customers. These services may include, but are not limited to applications for creating, consuming, and/or modifying content, file storage and management platforms, collaboration and communications platforms, and other types of software as a service.

The cloud-based service may include numerous servers, network devices, storage elements and other components to support the various services that are provided by the cloud-based service. For example, the cloud-based service may include one or more collections of computer servers, referred to as a server farm, which are configured to provide computational and/or storage resources for at least a portion of the services provided by the cloud-based service. Documents and other data related to the services provided by the cloud-based service are typically stored in one or more databases which are accessible by the servers.

Maintaining the documents in databases has historically been a challenge. As data in a database is changed, e.g., when documents, files, and data are created, updated, or deleted, processes for updating the database must be performed to update the database to reflect these changes. In some cases, however, update processes may be interrupted or halted (e.g., due to interrupts and/or failures) before an update can be completed which can result in outdated and incorrect information being left in the database as well as orphaned data (e.g., data without a reference to a parent object).

Addressing unfinished and failed updates typically require creating scripts for reprocessing the databases to complete the updates that were not finished with the original process. However, each unprocessed update (e.g., unprocessed backfilling, crawling, indexing, deleting, etc.) typically requires that a separate script be written to reprocess the update which can be time consuming and increase the likelihood of errors. In addition, such scripts typically must be run manually which consumes resources that could be better utilized elsewhere while also increasing the likelihood of deadlocks in the system requiring intervention to resolve.

What is needed are systems and methods for facilitating the reprocessing unfinished and failed updates that does not require the creation of a separate script for each update and that can be run automatically without risk of impacting database operations.

SUMMARY

In one general aspect, the instant disclosure presents a data processing system having a processor and a memory in communication with the processor wherein the memory stores executable instructions that, when executed by the processor, cause the data processing system to perform multiple operations. The operations may include receiving job definitions including SQL queries for performing reprocessing operations on databases in a database system of a cloud-based service via a user input device of a modular selective recrawl system; generating recrawl jobs based on the job definitions using a recrawl job generating module of the modular selective recrawl system; fighting the recrawl jobs to the database system using a fighting system of the cloud-based service; generating iterations of recrawl timer jobs for each of the databases in the database system based on a predefined recrawl timer job base class, each of the iterations being triggered based on a predefined schedule for the recrawl timer jobs, wherein, during each of the iterations, a recrawl timer job associated with a database of the database system is configured to perform functions. The functions include accessing a recrawl job list for the database, the recrawl job list including each of the recrawl timer jobs flighted to the database system; accessing a property list of the one of the databases to identify recrawl job information stored in the property list during a previous iteration of the recrawl timer job; based on the recrawl job information, selecting a respective batch of documents to be reprocessed in association with each of the recrawl jobs on the recrawl job list; reprocessing each of the respective batches of documents using the reprocessing operation of the recrawl job associated with the batch of documents; and once each of the batches of documents has been reprocessed, storing a last document identifier in the property list in association with each of the recrawl jobs.

In yet another general aspect, the instant disclosure presents a method for reprocessing documents in a database system. The method includes receiving job definitions including SQL queries for performing reprocessing operations on databases in a database system of a cloud-based service via a user input device of a modular selective recrawl system; generating recrawl jobs based on the job definitions using a recrawl job generating module of the modular selective recrawl system; flighting the recrawl jobs to the database system using a fighting system of the cloud-based service; generating iterations of recrawl timer jobs for each of the databases in the database system based on a predefined recrawl timer job base class, each of the iterations being triggered based on a predefined schedule for the recrawl timer jobs, wherein, during each of the iterations, a recrawl timer job associated with a database of the database system is configured to perform functions. The functions include accessing a recrawl job list for the database, the recrawl job list including each of the recrawl timer jobs flighted to the database system; accessing a property list of the one of the databases to identify recrawl job information stored in the property list during a previous iteration of the recrawl timer job; based on the recrawl job information, selecting a respective batch of documents to be reprocessed in association with each of the recrawl jobs on the recrawl job list; reprocessing each of the respective batches of documents using the reprocessing operation of the recrawl job associated with the batch of documents; and once each of the batches of documents has been reprocessed, storing a last document identifier in the property list in association with each of the recrawl jobs.

In a further general aspect, the instant application describes a non-transitory computer readable medium on which are stored instructions that when executed cause a programmable device to perform functions of receiving job definitions including SQL queries for performing reprocessing operations on databases in a database system of a cloud-based service via a user input device of a modular selective recrawl system; generating recrawl jobs based on the job definitions using a recrawl job generating module of the modular selective recrawl system; flighting the recrawl jobs to the database system using a flighting system of the cloud-based service; generating iterations of recrawl timer jobs for each of the databases in the database system based on a predefined recrawl timer job base class, each of the iterations being triggered based on a predefined schedule for the recrawl timer jobs, wherein, during each of the iterations, a recrawl timer job associated with a database of the database system is configured to perform functions. The functions include accessing a recrawl job list for the database, the recrawl job list including each of the recrawl timer jobs flighted to the database system; accessing a property list of the one of the databases to identify recrawl job information stored in the property list during a previous iteration of the recrawl timer job; based on the recrawl job information, selecting a respective batch of documents to be reprocessed in association with each of the recrawl jobs on the recrawl job list; reprocessing each of the respective batches of documents using the reprocessing operation of the recrawl job associated with the batch of documents; and once each of the batches of documents has been reprocessed, storing a last document identifier in the property list in association with each of the recrawl jobs.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
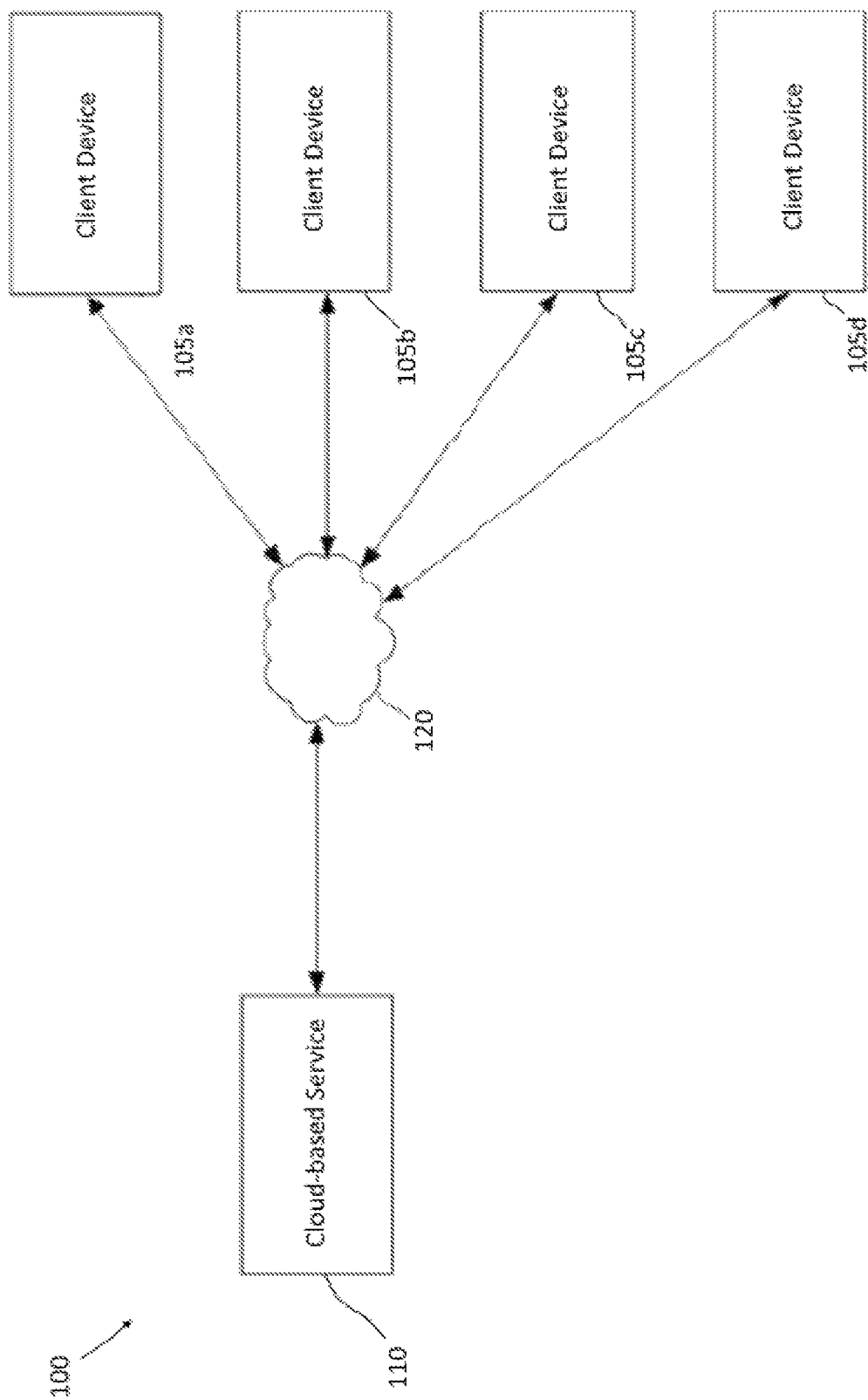
FIG. 1 depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

As data in a database is changed, update processes must be performed to update the database to reflect these changes. In some cases, update processes may be interrupted or halted (e.g., due to interrupts and/or failures) before an update can be completed which can result in inconsistent or incorrect data in the database as well as orphaned data (e.g., data having no reference to a parent object). Reprocessing unfinished and failed updates typically requires creating a different script to reprocess each unfinished update which can be time consuming and increase the likelihood of errors. In addition, such scripts typically have to be run manually. Manually running scripts for reprocessing unfinished and failed updates consumes resources that could be better utilized elsewhere and can cause deadlocks in the system requiring intervention to resolve.

To address these technical problems and more, in an example, this description provides technical solutions in the form of a modular database recrawl system that enables recrawl jobs to be defined for reprocessing updates to a database system. The modular database recrawl system includes a recrawl job generating component that enables recrawl jobs to be created based on a job definition received from a user without requiring that the user write the scripts for implementing the job. The job definition includes the SQL queries needed to perform a reprocessing operation on a database and defines other attributes required to create the job, such as job name, fight name, target (e.g., databases to reprocess), version identifier, and the like. Once a job definition has been received, the recrawl job generating component is configured to generate the recrawl job and to provide the recrawl job to a flight system for fighting the recrawl job the appropriate devices based on a predetermined deployment policy, or flight plan, for recrawl jobs.

The modular database recrawl system also includes a recrawl timer job base class that is used as the basis for generating recrawl timer jobs for executing the recrawl jobs on each database. Recall timer jobs are scheduled to be triggered on a regular or fixed basis for each database of a database system. Once a recall timer job for a database is triggered, the recrawl timer job is configured to cause documents in the database to be reprocessed in batches and at low priority with one batch being reprocessed during each iteration of the recrawl timer job. Iterations are performed until each of the documents in a database system have been reprocessed in accordance with the recrawl jobs that have been defined for the database system. The recrawl timer job is also configured to perform transaction queue size checks to determine whether executing a recrawl job will overload and/or limit the available memory for the transaction queue.

The technical solutions described herein address the technical problem associated with previously known methods of reprocessing unfinished and failed updates to a database system. The solutions facilitate the creation of recrawl jobs for reprocessing documents in a database system without requiring that separate scripts be written and ran individually by a user. The solutions, such as the use of batch processing, queue size checking, and other features described herein reduces the chances of database overload, low memory availability and deadlocks (e.g., situations in which two or more transactions are waiting for one another to give up locks).

FIG. 1 is a diagram showing an example computing environment 100 in which the techniques for implementing partitioned deployment policies for improved reliability of cloud-based services are provided may be implemented. The computing environment 100 may include a cloud-based service 110 that implements the techniques for executing the deployment policies described herein. The example computing environment 100 may also include one or more client devices, such as the client devices 105a, 105b, 105c, and 105d. The client devices 105a, 105b, 105c, and 105d may communicate with the cloud-based service 110 via the network 120. The network 120 may be a dedicated private network and/or the combination of public and private networks commonly referred to as the Internet.

In the example shown in FIG. 1, the cloud-based service 110 is configured to provide one or more services. These services may include, but are not limited to, applications for creating, consuming, and/or modifying content, file storage and management platforms, collaboration and communications platforms, and other types of software as a service. The cloud-based service 110 may include numerous servers, network devices, storage elements and other components to support the various services that are provided by the cloud-based service 110. For example, the cloud-based service 110 may include one or more collections of computer servers, referred to as a server farm, which are configured to provide computational and/or storage resources for at least a portion of the services provided by the cloud-based service 110. The server farm may be configured to provide fail-over protection so that if a computer server within the server farm experiences a failure, the tasks assigned to that server are handed off to another computer server within the farm.

The client devices 105a, 105b, 105c, and 105d (referred to collectively as client device 105) enable users to access the services provided by the cloud-based service 110. Client devices 105 are computing devices that may be implemented as a portable electronic device, such as a mobile phone, a tablet computer, a laptop computer, a portable digital assistant device, a portable game console, and/or other such devices. The client device 105 may also be implemented in computing devices having other form factors, such as a desktop computer, vehicle onboard computing system, a kiosk, a point-of-sale system, a video game console, and/or other types of computing devices. While the example implementation illustrated in FIG. 1 includes four client devices, other implementations may include a different number of client devices that may utilize the cloud-based service 110. Furthermore, in some implementations, some features of the services provided by the cloud-based service 110 may be implemented by a native application installed on the client device 105, and the native application may communicate with the cloud-based service 110 over a network connection to exchange data with the cloud-based service 110 and/or to access features implemented on the cloud-based service 110.

Figure 2:
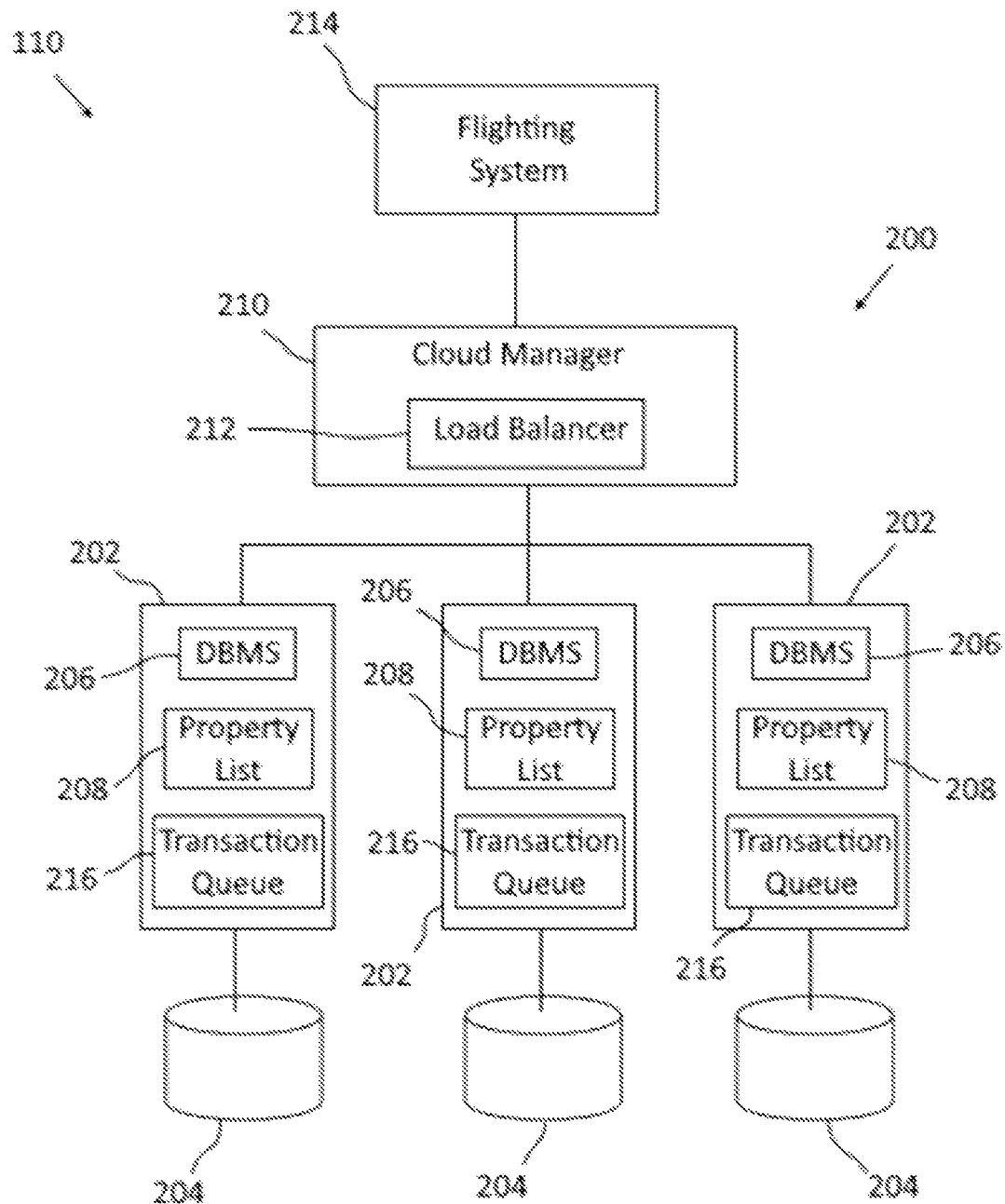
FIG. 2 depicts an example of a server farm for a cloud-based service, such as the cloud-based service of FIG. 1.

FIG. 2 shows the cloud-based service 110 in greater detail. Cloud-based service 110 includes a server farm 200 for implementing one or more services provided by the cloud-based service 110. In the embodiment of FIG. 2, the server farm 200 is configured to implement a database server farm. Although a single server farm is shown, cloud-based service 110 may include any suitable number of server farms. Server farm 200 includes a plurality of servers 202. Each server 202 may include one or more computing devices (not shown) which may be any of a variety of different types of computing device. For example, computing device may be a desktop computer, a server computer, a laptop, and the like. While only three servers are shown in FIG. 2, a server farm may have any suitable number of servers.

Server farm 200 includes a plurality of databases 204 for storing documents and data related to the one or more services offered by the cloud-based service. Servers 202 may include a database management system (DBMS) 206 for managing the storage of the data in the database and processes data manipulation statements or queries. Such statements and queries are processed, for example, to retrieve, update, insert, and/or delete data in a database. Queries are defined by a query language supported by the DBMS 206. DBMS 206 may support any suitable query language, such as Structured Query Language (SQL) for example, to define the queries that may be processed by DBMS 206. DBMS 206 may use metadata to index, search, retrieve and control access to data in the databases. Metadata may be stored in a database which enables the metadata to be queried using a database language, such as structured query language (SQL).

Servers 202 may include a property list 208 that defines various properties of the corresponding database. The property list may be modified to include additional properties or to remove existing properties depending on the application and/or needs of the user(s). Servers 202 may also include a transaction queue 216 for holding transactions (e.g., SQL queries) to be performed on the database 204.

Cloud-based service 110 may include a cloud computing manager 210 for managing resources of the cloud-based service 110. As such, the cloud computing manager 210 may be used for deploying, configuring and/or managing servers 202 and other resources of the system 110. The cloud computing manager 210 may be implemented in one or more computing devices which may be part of or separate from the servers 202. In embodiments, cloud computing manager 112 may be configured to implement a load balancer 212 for receiving requests from clients and directing requests to the appropriate server 202.

Cloud-based service may also include a flighting system 214 for flighting updates to the computing devices, such as servers 202, of the cloud-based service 110. For example, developers may develop updates for the cloud-based service 110 directed to maintenance (e.g., updating cloud infrastructure or application services), code fixes (e.g., correcting code), code updates (e.g., updating existing features), configurations (e.g., configuring settings or properties), customizations (e.g., enhancements requested by customers), and the like for the cloud-based service 110. The update may include programmed instructions, scripts, configuration data, and other content pertaining to the job, referred to herein collectively as "payload" or "job payload."

Flighting system 214 is configured to determine a flight plan for deploying each update to the cloud-based service 110 based on various factors, such as the type of update, scope of the update, and risk of the update. The deployment policy may define validation rings for gradually rolling out the update. The flighting system is then configured to deploy the update in the manner and to the devices prescribed by the flight plan for the update.

As discussed above, when documents are created, updated, or deleted in a database, update processes must be performed to update the database to reflect these changes. In some cases, update processes may be interrupted or halted (e.g., due to interrupts and/or failures) before an update can be completed. To address the need for reprocessing unfinished and failed updates, the present disclosure describes a modular database recrawl system that facilitates the creation and deployment of reprocessing jobs in the databases of the cloud-based service in a safe and reliable manner without requiring user intervention.

Figure 3:
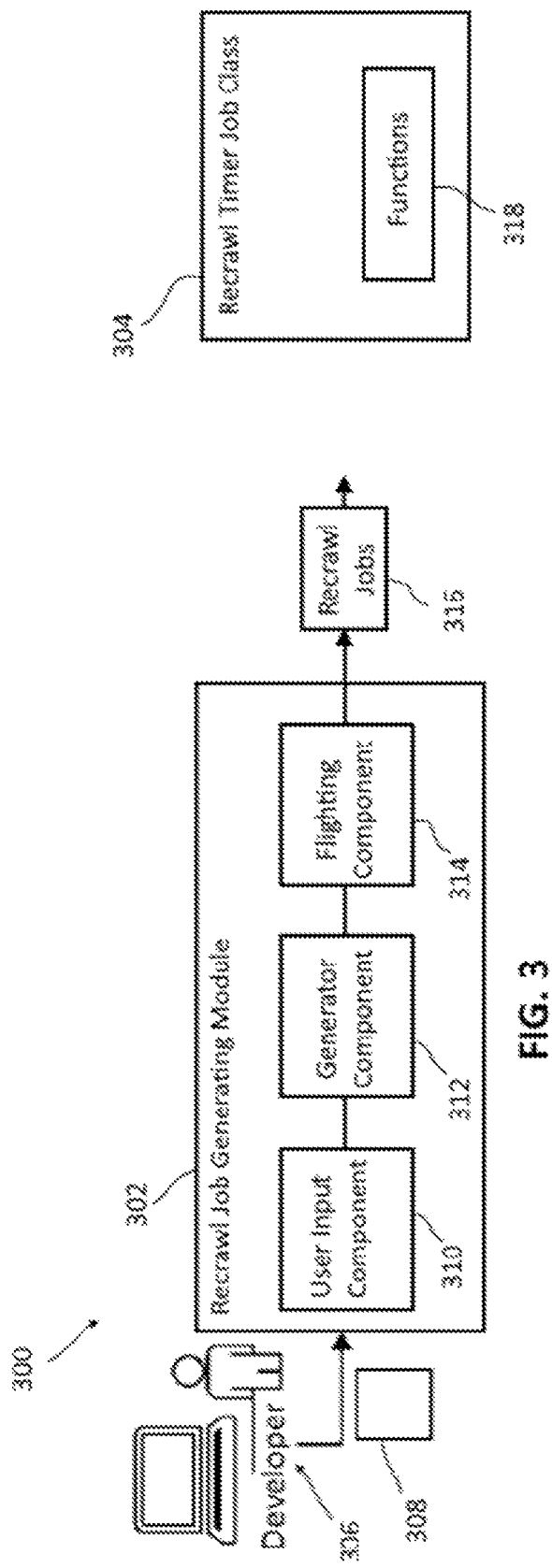
FIG. 3 depicts a diagram of a modular selective recrawl system for server farm of FIG. 2.

An example implementation of a modular database recrawl system 300 is shown in FIG. 3. The modular database recrawl system 300 includes a recrawl job generating module 302 and a recrawl timer job class 304. Recrawl job generating module 302 is configured to receive input from a user 306 in the form of a job definition 308 that defines certain required job attributes for the recrawl job and includes the SQL queries for implementing the reprocessing operation for the job. Recrawl job generating module 302 includes an input component 310 that is configured to receive job definitions 308 for recrawl jobs. Input component 310 may include a user interface that can be presented on the display of a computing device and that enables a user, such as developer, administrator or other suitable personnel, to input the job definitions 308.

Figure 4:
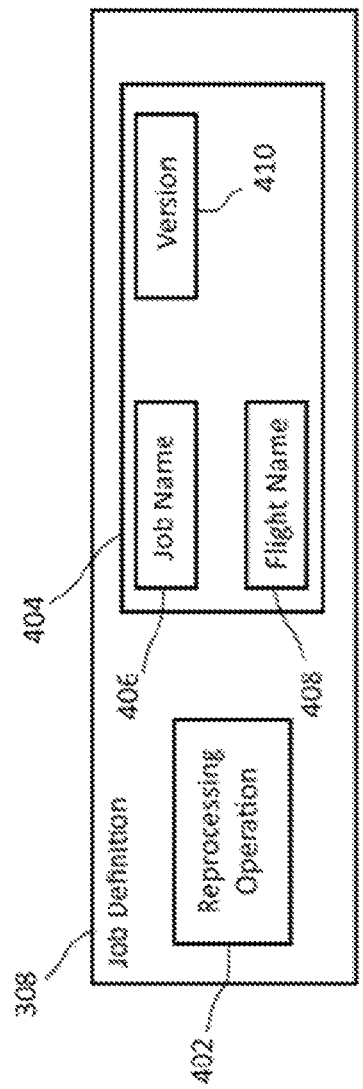
FIG. 4 depicts a diagram of a job definition for the modular selective recrawl system of FIG. 3.

Examples of job attributes that may be required for generating recrawl jobs include job name and flight name. Reprocessing operations may be configured to implement any type of process, such as backfilling a new property, backfilling missing values, deleting orphaned data (e.g., orphaned sites), and the like. The SQL queries for implementing the reprocessing operation for a job may also include queries for identifying and/or counting database objects that require reprocessing. An example illustration of job definition 308 is shown in FIG. 4. Job definition 308 includes the defined reprocessing operation 402 as well as required attributes 404 for generating a recrawl job which in this case include at least a job name 406 and a flight name 408. In embodiments, a job definition 308 may be required to define a version identifier 410 (e.g., GUID), for indicating the version of the recrawl job which may be useful in cases in which the reprocessing operation for a recrawl job has been updated or changed for some reason. As discussed below, the version identifier of recrawl jobs may be checked to ensure that the most current version is being executed and so that prior versions can be removed.

Once the job definition 308 has been received, the recrawl job generating module 302 includes a generator component 312 that is configured to generate recrawl jobs 316 based at least in part on the attributes 404 defined by the job definition 308. The recrawl job generating module 302 also includes a fighting component 314 that is configured to submit recrawl jobs 316 to the flighting system 214 so they can be flighted to the servers, such as servers 202, as an update for safe rollout.

The recrawl timer job class 304 includes programmed instructions, scripts, configuration data, and the like for implementing recrawl timer jobs for executing the recrawl jobs 316 on the databases. For example, the recrawl timer job class 304 may include functions 318 that enable recrawl timer jobs to execute SQL queries for selecting documents in a database for recrawl and identifying documents used to indicate starting points and ending points for processing. As is known in the art, a "timer job" is a job configured to perform a predefined process according to a predefined schedule. The cloud-based service 110 incudes mechanisms for triggering timer jobs according to their predefined schedules. In embodiments, recrawl timer jobs may be triggered for each database according to a fixed schedule. Any suitable timing and/or frequency for triggering recrawl timer jobs may be utilized.

Figure 5:
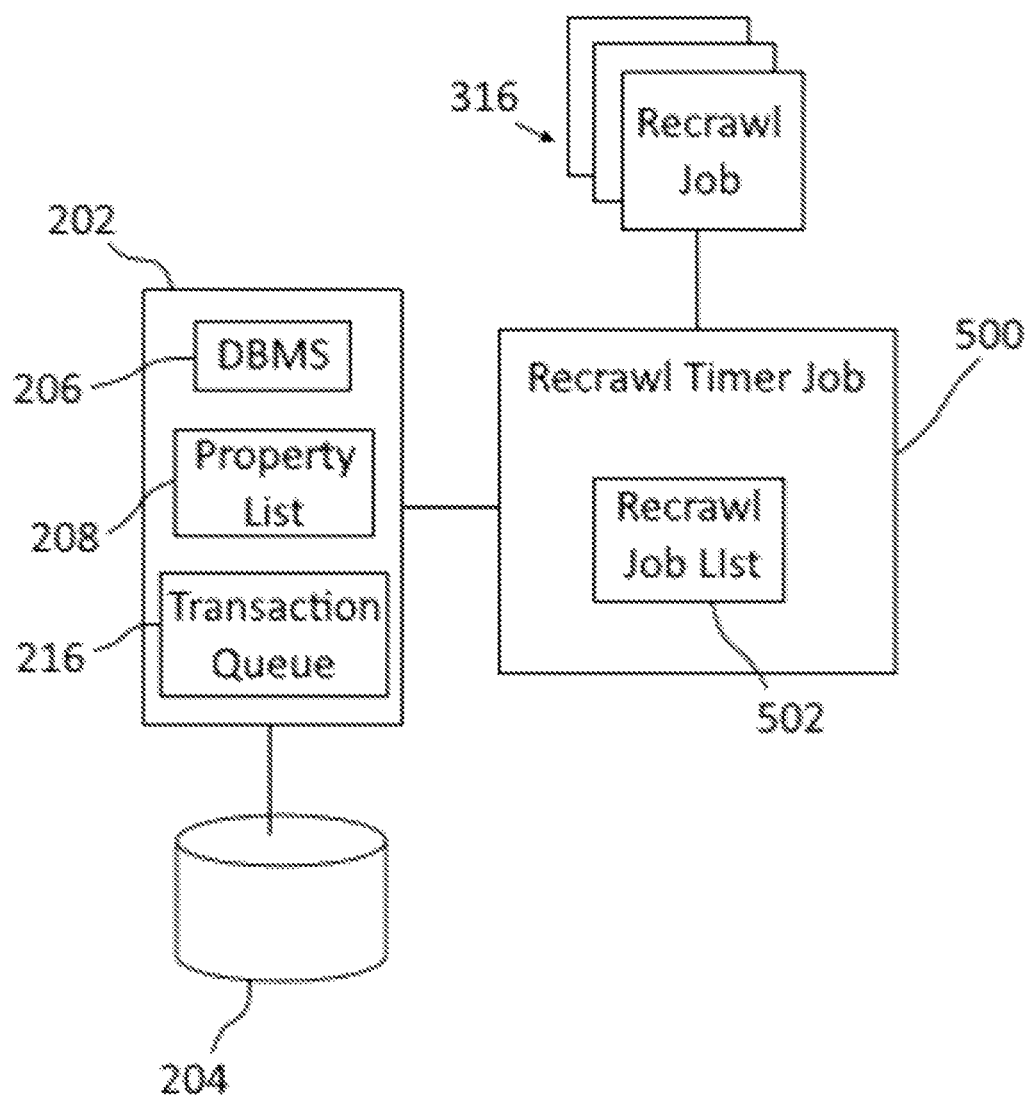
FIG. 5 depicts a recrawl timer job of the modular selective recrawl system for reprocessing updates in a database of database system.

Recall timer jobs are scheduled to be periodically triggered for each database that is to be reprocessed, as shown in FIG. 5. In the example of FIG. 5, a single database 204 and server 202 are shown along with an associated recrawl timer job 500. Once a recrawl timer job 500 has been triggered for a database 204, the recrawl timer job 500 is configured to execute the recrawl jobs 316 to reprocess documents in the database 204. To this end, the recall timer job 500 is configured to generate and/or access a recrawl job list 502. The recrawl job list 502 is a list of all the recrawl jobs 316 that have been generated and flighted to the server 202. The recrawl job list 502 may be generated in any suitable manner.

Each time a recrawl timer job 500 is triggered is referred to as an "iteration." During each iteration of a recrawl timer job 500, the recrawl timer job 500 is configured to execute each respective recrawl job 316 on the recrawl job list 502 by performing the SQL queries associated with each respective recrawl job 316 to select documents in the database for recrawl and to perform the corresponding reprocessing operation on these documents.

Recrawl timer job 500 is configured to cause the documents to be reprocessed in batches for each recrawl job 316 and at low priority which reduces the chances of database overload, low memory availability and deadlocks (e.g., situations in which two or more transactions are waiting for one another to give up locks). Any suitable batch size may be utilized. In embodiments, a recrawl timer job 500 may be configured to identify when a deadlock has occurred in processing a recrawl job in which case the recrawl timer job 500 may be configured to halt the current iteration of the recrawl timer job to alleviate the deadlock.

To further reduce the chances of overload and low memory availability, recrawl timer job 500 may be configured to perform a queue size check on the database transaction queue 216. In embodiments, a queue size threshold may be predefined for the transaction queue 216 that is indicative of possible overload or limited memory availability for the transaction queue. Before executing any recrawl jobs on a database, the recrawl timer job 500 may be configured to determine whether the size of the transaction queue 216 exceeds the queue size threshold. If the queue size does exceed the queue size threshold, the current iteration of the recrawl timer job 500 may be halted and removed before any recrawl jobs 316 have been executed. If the transaction queue size is less than the queue size threshold, reprocessing of the database during the current iteration may continue.

During each iteration, one batch of documents is selected for each recrawl job 316 by the recrawl timer job. Completing a recrawl job 316 for a database may require multiple iterations of the recrawl timer job 316. To enable documents to be reprocessed over multiple iterations, the recrawl timer job 500 is configured to determine the document identifier associated with the last document reprocessed for each recrawl job during an iteration (e.g., LastDocID) and to store the last document identifier in a manner that is accessible to the next iteration of the recrawl timer job. In embodiments, the recrawl timer job 500 is configured to create property fields in the property list 208 of the database 204 for each recrawl job 316 that may be used to store the last document identifier for each recrawl job at the end of each iteration.

Before reprocessing commences, the recrawl timer job 500 may read the last document identifier for each recrawl job 316 from the property list 208. The recrawl timer job 500 may then be configured to select the next batch of documents for each respective recrawl job 316 based on the last document identifier. For example, for a given recrawl job, the recrawl timer job 500 may be configured to perform an SQL query that marks the batch of documents to be reprocessed beginning with the document following the document pointed to by the last document identifier and ending with the document corresponding to the size of the batch. When a last document identifier is not stored in the property list 206 for a recrawl job 316, the recrawl timer job may use that as an indication that reprocessing for that recrawl job should be started at the beginning of the document list.

The recrawl timer job 500 may also be configured to determine the maximum document identifier (e.g., MaxDocID) for a database which is indicative of the total number of documents in the database. The maximum document identifier for a database may be used to determine when a recrawl job 316 has been completed on that database. In embodiments, recrawl timer job may be configured to perform a query to retrieve the maximum document identifier for the database.

Recrawl timer job may be configured to determine when a recrawl job 316 has been completed for a database based on the maximum document identifier for the database in any suitable manner. For example, a recrawl job may be considered complete if the last document identifier equals the maximum document identifier. In embodiments, recrawl timer job 500 may be configured to include an indication in the recrawl job list 502 that the recrawl job was completed. Once a recrawl job 316 has been completed on all databases, the recrawl job may be deleted from the recrawl job list. In addition, the recrawl timer job 500 for each database may delete the property fields associated with the recrawl job 316 from the corresponding property list 208.

Other properties of recrawl jobs may be stored in the property list of a database. For example, the version identifier 410 for each recrawl job 316 may be stored in the property list 208. At the beginning of each iteration, recall timer job 500 may be configured to compare the version identifier of a recrawl job stored in the property list to the version identifier of the recrawl job in the recrawl job list 502 to determine whether the recrawl job has been updated since the last iteration. If the recrawl timer job 500 determines that a recrawl job has been updated, the recrawl timer job may be configured delete the properties associated with the recrawl job from the property list 208 so that, in the next iteration, the recrawl job will begin reprocessing from the beginning of the documents.

Figure 6:
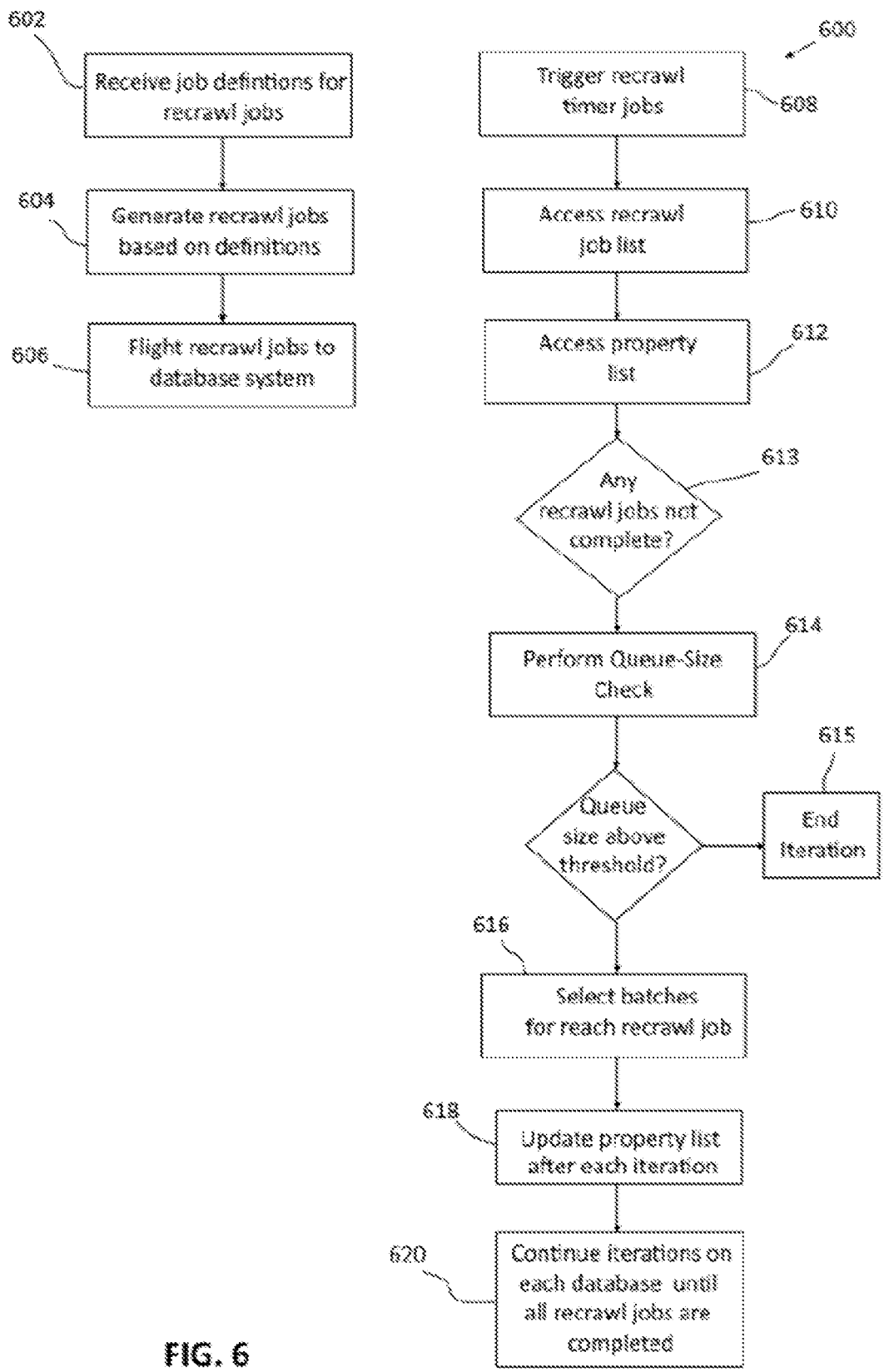
FIG. 6 depicts a flowchart of another example method reprocessing updates utilizing a modular selective recrawl system in accordance with this disclosure.

A method of generating and executing recrawl jobs on databases of a database system will now be described with reference to FIG. 6. The method begins with receiving job definitions for recrawl jobs (block 602) for a database system. The job definitions define SQL queries for performing reprocessing operations on documents in each of the databases of the database system and required attributes for generating the recrawl jobs. Recrawl jobs are then generated based on the reprocessing operations to be performed and required attributes of the respective recrawl jobs (block 604). The recrawl jobs are then flighted individually to the database system (block 606).

Recrawl timer jobs are triggered for each of the databases based on a predefined schedule (block 608). Each time a recrawl job is triggered for a database, the recrawl timer job accesses a recrawl job list that includes all of the recrawl jobs that have been flighted to the system (block 610). The recrawl timer job also accesses a property list for the database to identify any recrawl job information in the property list pertaining to the recrawl jobs on the recrawl job list (block 612). If the recrawl job information indicates that any of the recrawl jobs on the recrawl job list have not been completed (block 613), a transaction queue size check is performed (block 614). If the queue size of the transaction queue is above a queue size threshold, the current iteration of the recrawl time job is ended (block 615). If the size of the transaction queue is below the threshold, the recrawl timer job is configured to execute each of the recrawl jobs that must still be executed on the database.

The recrawl job timer then selects a batch of documents for each of the recrawl jobs that have not been completed based on the recrawl job information stored in the property list (block 616). For example, the recrawl job information may indicate a last document identifier which points to a last document reprocessed during a previous iteration of the recrawl timer job. The recrawl job information may also indicate a maximum document identifier which indicates the number of documents stored in the database. The batch of documents selected for a recrawl job may start with the document following the last document reprocessed during the previous iteration of the recrawl timer job. Otherwise, the batch of documents selected for a recrawl job may start with a first document in the database.

The recrawl timer job initiates reprocessing of each of the batch of documents according to the reprocessing operation defined by the recrawl job associated with the batch of documents. Once the reprocessing of each of the batch of documents has been completed, the recrawl timer job updates the recrawl job information in the property list to include a last document identifier for each of the recrawl jobs which points to a last document reprocessed during the current iteration of the recrawl timer job (block 618). Iterations are continued on each database until each recrawl job has been completed on each database (block 620).

Figure 7:
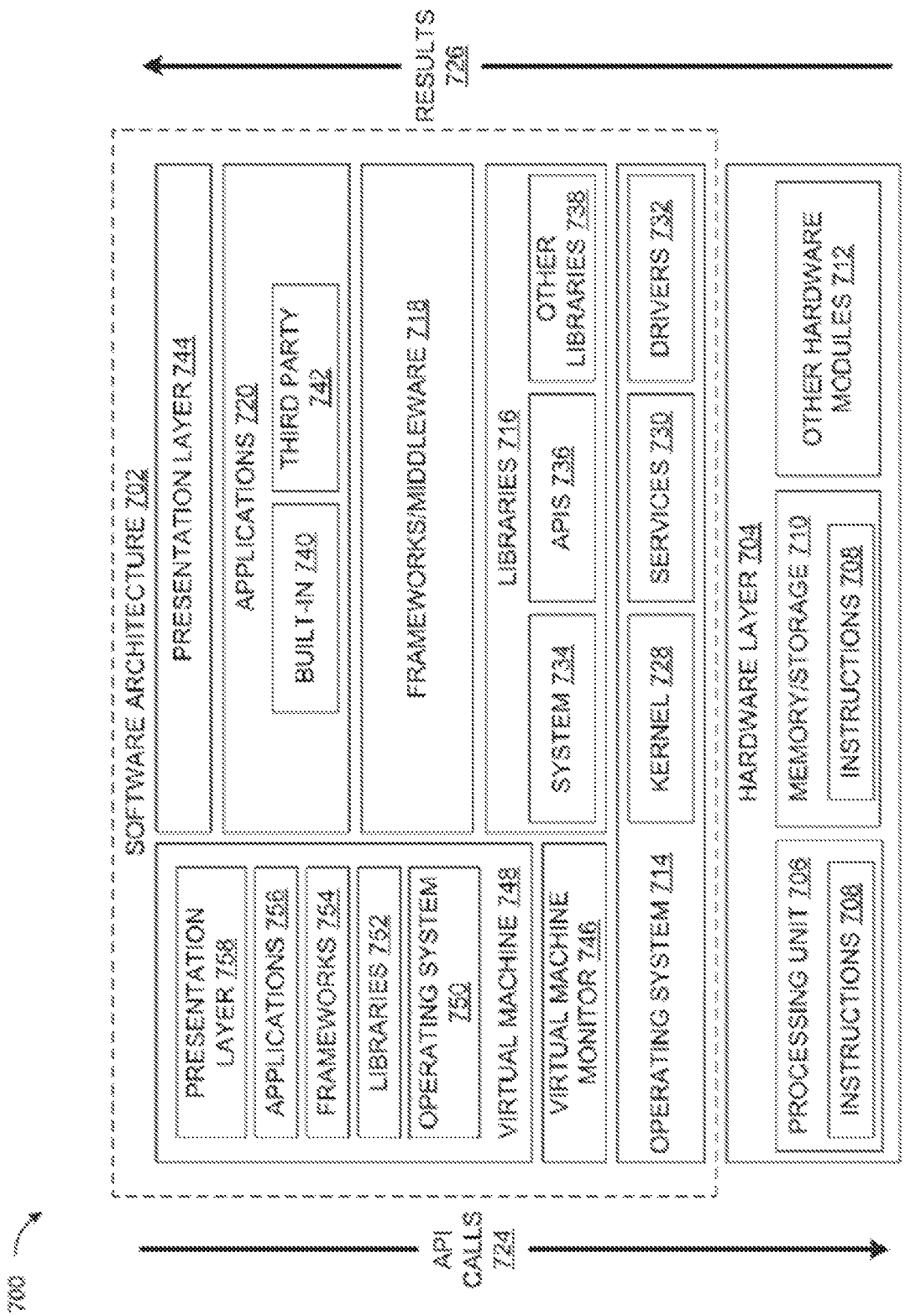
FIG. 7 is a block diagram illustrating an example software architecture, various portions of which may be used in conjunction with various hardware architectures herein described.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
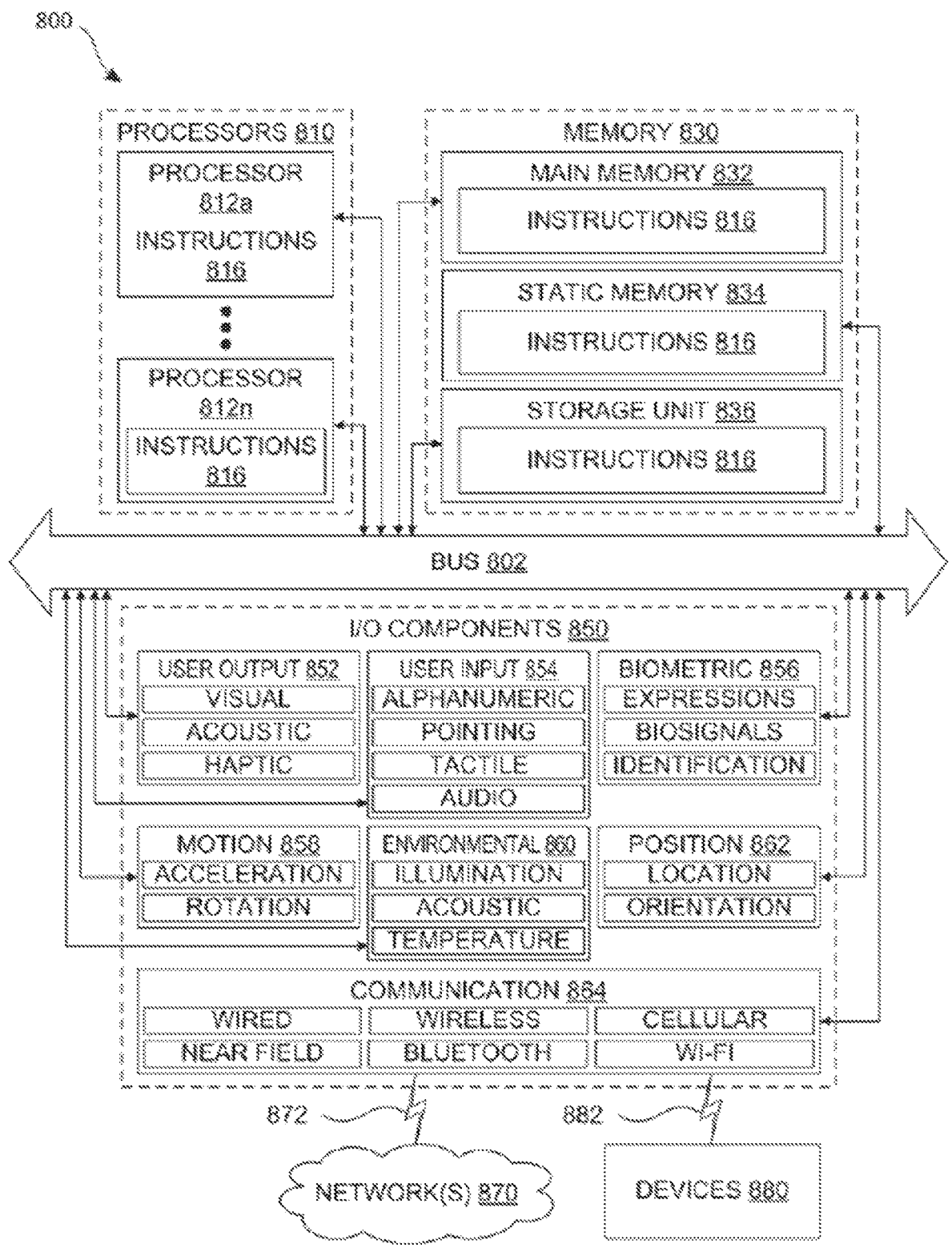
FIG. 8 is a block diagram illustrating components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 864, such as, but not limited to, geo-location via Internet Protocol (IP) address, location via Wi-Fi, cellular, NFC, Bluetooth, or other wireless station identification and/or signal triangulation.

In the following, further features, characteristics and advantages of the invention will be described by means of items:

Item 1. A data processing device comprising:
    at least one processor; and
    a machine-readable medium storing executable instructions that, when executed, cause the processor to perform operations comprising:
        receiving job definitions including SQL queries for performing reprocessing operations on databases in a database system of a cloud-based service via a user input device of a modular selective recrawl system;
        generating recrawl jobs based on the job definitions using a recrawl job generating module of the modular selective recrawl system;
        fighting the recrawl jobs to the database system using a fighting system of the cloud-based service;
        generating iterations of recrawl timer jobs for each of the databases in the database system based on a predefined recrawl timer job base class, each of the iterations being triggered based on a predefined schedule for the recrawl timer jobs, wherein, during each of the iterations, a recrawl timer job associated with a database of the database system is configured to perform functions comprising:
            accessing a recrawl job list for the database, the recrawl job list including each of the recrawl timer jobs flighted to the database system;
            accessing a property list of the one of the databases to identify recrawl job information stored in the property list during a previous iteration of the recrawl timer job;

based on the recrawl job information, selecting a respective batch of documents to be reprocessed in association with each of the recrawl jobs on the recrawl job list;

reprocessing each of the respective batches of documents using the reprocessing operation of the recrawl job associated with the batch of documents; and once each of the batches of documents has been reprocessed, storing a last document identifier in the property list in association with each of the recrawl jobs.

Item 2. The data processing device of item 1, wherein the functions further comprise:

identifying the recrawl jobs in the recrawl job list that have not been completed based on the recrawl job information in the property list; and wherein selecting the respective batch of documents includes selecting batches of documents for only the recrawl jobs that have not been completed.

Item 3. The data processing device of item 2, further comprising:

when the recrawl job list includes a recrawl job that has not been completed, performing a check of a transaction queue of the database by comparing a queue size of the transaction queue to a predefined queue size threshold; and when the queue size of the transaction queue exceeds the predefined threshold, ending a current iteration of the recrawl timer job without reprocessing any documents in the database.

Item 4. The data processing device of item 2, further comprising:

when the recrawl job list includes a recrawl job that has not been completed, performing a check of the transaction queue of the database by comparing a queue size of the transaction queue to a predefined queue size threshold; and when the queue size of the transaction queue is below the predefined threshold, adding the reprocessing operations associated with the recrawl jobs that have not been completed to the transaction queue for the database.

Item 5. The data processing device of item 2, wherein selecting the respective batch of documents further comprises:

Identifying a last document identifier for at least one of the recrawl jobs in the recrawl job information; and selecting the respective batches of documents for the at least one recrawl jobs based on the identified last document identifier for the at least one recrawl jobs.

Item 6. The data processing device of item 1, wherein the reprocessing operations are performed at a lowest priority for jobs performed in the database.

Item 7. The data processing device of item 2, wherein the job definitions include version identifiers for each of the recrawl job, and wherein identifying the recrawl jobs in the recrawl job list that have not been completed further comprises:

determining whether the version identifier of any of the recrawl jobs on the recrawl job list that have not been completed indicates that the recrawl job has been updated since a previous iteration of the recrawl timer job; and deleting recrawl job information from the property list associated with any of the recrawl jobs that have been determined to have been updated.

Item 8. The data processing device of item 1, wherein the iterations are performed until each of the recrawl jobs has been completed on each one of the databases of the database system.

Item 9. A method for reprocessing documents in a database system, the method comprising:

receiving job definitions including SQL queries for performing reprocessing operations on databases in a database system of a cloud-based service via a user input device of a modular selective recrawl system;

generating recrawl jobs based on the job definitions using a recrawl job generating module of the modular selective recrawl system;

fighting the recrawl jobs to the database system using a fighting system of the cloud-based service;

generating iterations of recrawl timer jobs for each of the databases in the database system based on a predefined recrawl timer job base class, each of the iterations being triggered based on a predefined schedule for the recrawl timer jobs, wherein, during each of the iterations, a recrawl timer job associated with a database of the database system is configured to perform functions comprising:

accessing a recrawl job list for the database, the recrawl job list including each of the recrawl timer jobs flighted to the database system;

accessing a property list of the one of the databases to identify recrawl job information stored in the property list during a previous iteration of the recrawl timer job;

based on the recrawl job information, selecting a respective batch of documents to be reprocessed in association with each of the recrawl jobs on the recrawl job list;

reprocessing each of the respective batches of documents using the reprocessing operation of the recrawl job associated with the batch of documents; and once each of the batches of documents has been reprocessed, storing a last document identifier in the property list in association with each of the recrawl jobs.

Item 10. The method of item 9, wherein the functions further comprise:

identifying the recrawl jobs in the recrawl job list that have not been completed based on the recrawl job information in the property list; and wherein selecting the respective batch of documents includes selecting batches of documents for only the recrawl jobs that have not been completed.

Item 11. The method of item 10, further comprising:

when the recrawl job list includes a recrawl job that has not been completed, performing a check of a transaction queue of the database by comparing a queue size of the transaction queue to a predefined queue size threshold; and when the queue size of the transaction queue exceeds the predefined threshold, ending a current iteration of the recrawl timer job without reprocessing any documents in the database.

Item 12. The method of item 10, further comprising:

when the recrawl job list includes a recrawl job that has not been completed, performing a check of the transaction queue of the database by comparing a queue size of the transaction queue to a predefined queue size threshold; and when the queue size of the transaction queue is below the predefined threshold, adding the reprocessing operations associated with the recrawl jobs that have not been completed to the transaction queue for the database.

Item 13. The method of item 9, wherein selecting the respective batch of documents further comprises:

identifying a last document identifier for at least one of the recrawl jobs in the recrawl job information; and selecting the respective batches of documents for the at least one recrawl jobs based on the identified last document identifier for the at least one recrawl jobs.

Item 14. The method of item 9, wherein the reprocessing operations are performed at a lowest priority for jobs performed in the database.

Item 15. The method of item 10, wherein the job definitions include version identifiers for each of the recrawl job, and wherein identifying the recrawl jobs in the recrawl job list that have not been completed further comprises:

determining whether the version identifier of any of the recrawl jobs on the recrawl job list that have not been completed indicates that the recrawl job has been updated since a previous iteration of the recrawl timer job; and deleting recrawl job information from the property list associated with any of the recrawl jobs that have been determined to have been updated.

Item 16. The method of item 9, wherein the iterations are performed until each of the recrawl jobs has been completed on each one of the databases of the database system.

Item 17. A non-transitory computer readable medium on which are stored instructions that, when executed, cause a programmable device to perform functions of:

receiving job definitions including SQL queries for performing reprocessing operations on databases in a database system of a cloud-based service via a user input device of a modular selective recrawl system;

generating recrawl jobs based on the job definitions using a recrawl job generating module of the modular selective recrawl system;

fighting the recrawl jobs to the database system using a fighting system of the cloud-based service;

generating iterations of recrawl timer jobs for each of the databases in the database system based on a predefined recrawl timer job base class, each of the iterations being triggered based on a predefined schedule for the recrawl timer jobs, wherein, during each of the iterations, a recrawl timer job associated with a database of the database system is configured to perform functions comprising:

accessing a recrawl job list for the database, the recrawl job list including each of the recrawl timer jobs flighted to the database system;

accessing a property list of the one of the databases to identify recrawl job information stored in the property list during a previous iteration of the recrawl timer job;

based on the recrawl job information, selecting a respective batch of documents to be reprocessed in association with each of the recrawl jobs on the recrawl job list;

reprocessing each of the respective batches of documents using the reprocessing operation of the recrawl job associated with the batch of documents; and once each of the batches of documents has been reprocessed, storing a last document identifier in the property list in association with each of the recrawl jobs.

Item 18. The non-transitory computer readable medium of item 17, wherein the functions further comprise:

identifying the recrawl jobs in the recrawl job list that have not been completed based on the recrawl job information in the property list; and wherein selecting the respective batch of documents includes selecting batches of documents for only the recrawl jobs that have not been completed.

Item 19. The non-transitory computer readable medium of item 18, further comprising:

when the recrawl job list includes a recrawl job that has not been completed, performing a check of a transaction queue of the database by comparing a queue size of the transaction queue to a predefined queue size threshold; and when the queue size of the transaction queue exceeds the predefined threshold, ending a current iteration of the recrawl timer job without reprocessing any documents in the database.

Item 20. The non-transitory computer readable medium of item 18, further comprising:

when the recrawl job list includes a recrawl job that has not been completed, performing a check of the transaction queue of the database by comparing a queue size of the transaction queue to a predefined queue size threshold; and when the queue size of the transaction queue is below the predefined threshold, adding the reprocessing operations associated with the recrawl jobs that have not been completed to the transaction queue for the database.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing device comprising:
   at least one processor; and
   a machine-readable medium storing executable instructions that, when executed, cause the processor to perform operations comprising:
      receiving job definitions including SQL queries for performing reprocessing operations on databases in a database system of a cloud-based service via a user input device of a modular selective recrawl system;
      generating recrawl jobs based on the job definitions using a recrawl job generating module of the modular selective recrawl system;
      fighting the recrawl jobs to the database system using a fighting system of the cloud-based service;
      generating iterations of recrawl timer jobs for each of the databases in the database system based on a predefined recrawl timer job base class, each of the iterations being triggered based on a predefined schedule for the recrawl timer jobs, wherein, during each of the iterations, a recrawl timer job associated with a database of the database system is configured to perform functions comprising:
         accessing a recrawl job list for the database, the recrawl job list including each of the recrawl timer jobs flighted to the database system;
         accessing a property list of the database to identify recrawl job information stored in the property list during a previous iteration of the recrawl timer job;
         based on the recrawl job information, selecting a respective batch of documents to be reprocessed in association with each of the recrawl jobs on the recrawl job list;
         reprocessing each of the respective batches of documents using the reprocessing operation of the recrawl job associated with the batch of documents; and
         once each of the batches of documents has been reprocessed, storing a last document identifier in the property list in association with each of the recrawl jobs.

2. The data processing device of claim 1, wherein the functions further comprise:
   identifying the recrawl jobs in the recrawl job list that have not been completed based on the recrawl job information in the property list; and
   wherein selecting the respective batch of documents includes selecting batches of documents for only the recrawl jobs that have not been completed.

3. The data processing device of claim 2, further comprising:
   when the recrawl job list includes a recrawl job that has not been completed, performing a check of a transaction queue of the database by comparing a queue size of the transaction queue to a predefined queue size threshold; and
   when the queue size of the transaction queue exceeds the predefined threshold, ending a current iteration of the recrawl timer job without reprocessing any documents in the database.

4. The data processing device of claim 2, further comprising:
   when the recrawl job list includes a recrawl job that has not been completed, performing a check of a transaction queue of the database by comparing a queue size of the transaction queue to a predefined queue size threshold; and
   when the queue size of the transaction queue is below the predefined threshold, adding the reprocessing operations associated with the recrawl jobs that have not been completed to the transaction queue for the database.

5. The data processing device of claim 2, wherein selecting the respective batch of documents further comprises:
   Identifying a last document identifier for at least one of the recrawl jobs in the recrawl job information; and
   selecting the respective batches of documents for the at least one recrawl jobs based on the identified last document identifier for the at least one recrawl jobs.

6. The data processing device of claim 1, wherein the reprocessing operations are performed at a lowest priority for jobs performed in the database.

7. The data processing device of claim 2, wherein the job definitions include version identifiers for each of the recrawl job, and
   wherein identifying the recrawl jobs in the recrawl job list that have not been completed further comprises:
      determining whether the version identifier of any of the recrawl jobs on the recrawl job list that have not been completed indicates that the recrawl job has been updated since a previous iteration of the recrawl timer job; and
      deleting recrawl job information from the property list associated with any of the recrawl jobs that have been determined to have been updated.

8. The data processing device of claim 1, wherein the iterations are performed until each of the recrawl jobs has been completed on each one of the databases of the database system.

9. A method for reprocessing documents in a database system, the method comprising:
receiving job definitions including SQL queries for performing reprocessing operations on databases in a database system of a cloud-based service via a user input device of a modular selective recrawl system;
generating recrawl jobs based on the job definitions using a recrawl job generating module of the modular selective recrawl system;
fighting the recrawl jobs to the database system using a fighting system of the cloud-based service;
generating iterations of recrawl timer jobs for each of the databases in the database system based on a predefined recrawl timer job base class, each of the iterations being triggered based on a predefined schedule for the recrawl timer jobs, wherein, during each of the iterations, a recrawl timer job associated with a database of the database system is configured to perform functions comprising:
accessing a recrawl job list for the database, the recrawl job list including each of the recrawl timer jobs flighted to the database system;
accessing a property list of the database to identify recrawl job information stored in the property list during a previous iteration of the recrawl timer job;
based on the recrawl job information, selecting a respective batch of documents to be reprocessed in association with each of the recrawl jobs on the recrawl job list;
reprocessing each of the respective batches of documents using the reprocessing operation of the recrawl job associated with the batch of documents; and
once each of the batches of documents has been reprocessed, storing a last document identifier in the property list in association with each of the recrawl jobs.

10. The method of claim 9, wherein the functions further comprise:
identifying the recrawl jobs in the recrawl job list that have not been completed based on the recrawl job information in the property list; and
wherein selecting the respective batch of documents includes selecting batches of documents for only the recrawl jobs that have not been completed.

11. The method of claim 10, further comprising:
when the recrawl job list includes a recrawl job that has not been completed, performing a check of a transaction queue of the database by comparing a queue size of the transaction queue to a predefined queue size threshold; and
when the queue size of the transaction queue exceeds the predefined threshold, ending a current iteration of the recrawl timer job without reprocessing any documents in the database.

12. The method of claim 10, further comprising:
when the recrawl job list includes a recrawl job that has not been completed, performing a check of a transaction queue of the database by comparing a queue size of the transaction queue to a predefined queue size threshold; and
when the queue size of the transaction queue is below the predefined threshold, adding the reprocessing operations associated with the recrawl jobs that have not been completed to the transaction queue for the database.

13. The method of claim 9, wherein selecting the respective batch of documents further comprises:
identifying a last document identifier for at least one of the recrawl jobs in the recrawl job information; and
selecting the respective batches of documents for the at least one recrawl jobs based on the identified last document identifier for the at least one recrawl jobs.

14. The method of claim 9, wherein the reprocessing operations are performed at a lowest priority for jobs performed in the database.

15. The method of claim 10, wherein the job definitions include version identifiers for each of the recrawl job, and
wherein identifying the recrawl jobs in the recrawl job list that have not been completed further comprises:
determining whether the version identifier of any of the recrawl jobs on the recrawl job list that have not been completed indicates that the recrawl job has been updated since a previous iteration of the recrawl timer job; and
deleting recrawl job information from the property list associated with any of the recrawl jobs that have been determined to have been updated.

16. The method of claim 9, wherein the iterations are performed until each of the recrawl jobs has been completed on each one of the databases of the database system.

17. A non-transitory computer readable medium on which are stored instructions that, when executed, cause a programmable device to perform functions of:
receiving job definitions including SQL queries for performing reprocessing operations on databases in a database system of a cloud-based service via a user input device of a modular selective recrawl system;
generating recrawl jobs based on the job definitions using a recrawl job generating module of the modular selective recrawl system;
fighting the recrawl jobs to the database system using a fighting system of the cloud-based service;
generating iterations of recrawl timer jobs for each of the databases in the database system based on a predefined recrawl timer job base class, each of the iterations being triggered based on a predefined schedule for the recrawl timer jobs, wherein, during each of the iterations, a recrawl timer job associated with a database of the database system is configured to perform functions comprising:
accessing a recrawl job list for the database, the recrawl job list including each of the recrawl timer jobs flighted to the database system;
accessing a property list of the database to identify recrawl job information stored in the property list during a previous iteration of the recrawl timer job;
based on the recrawl job information, selecting a respective batch of documents to be reprocessed in association with each of the recrawl jobs on the recrawl job list;
reprocessing each of the respective batches of documents using the reprocessing operation of the recrawl job associated with the batch of documents; and
once each of the batches of documents has been reprocessed, storing a last document identifier in the property list in association with each of the recrawl jobs.

18. The non-transitory computer readable medium of claim 17, wherein the functions further comprise:
identifying the recrawl jobs in the recrawl job list that have not been completed based on the recrawl job information in the property list; and
wherein selecting the respective batch of documents includes selecting batches of documents for only the recrawl jobs that have not been completed.

19. The non-transitory computer readable medium of claim 18, further comprising:
when the recrawl job list includes a recrawl job that has not been completed, performing a check of a transaction queue of the database by comparing a queue size of the transaction queue to a predefined queue size threshold; and
when the queue size of the transaction queue exceeds the predefined threshold, ending a current iteration of the recrawl timer job without reprocessing any documents in the database.

20. The non-transitory computer readable medium of claim 18, further comprising:
when the recrawl job list includes a recrawl job that has not been completed, performing a check of a transaction queue of the database by comparing a queue size of the transaction queue to a predefined queue size threshold; and
when the queue size of the transaction queue is below the predefined threshold, adding the reprocessing operations associated with the recrawl jobs that have not been completed to the transaction queue for the database.

* * * * *